Aug. 24, 1954     A. W. WAHLER     2,687,222
STRUCTURE FOR PARKING AUTOMOBILES

Filed Feb. 19, 1951     4 Sheets-Sheet 1

INVENTOR.
August W. Wahler
BY
ATTORNEY.

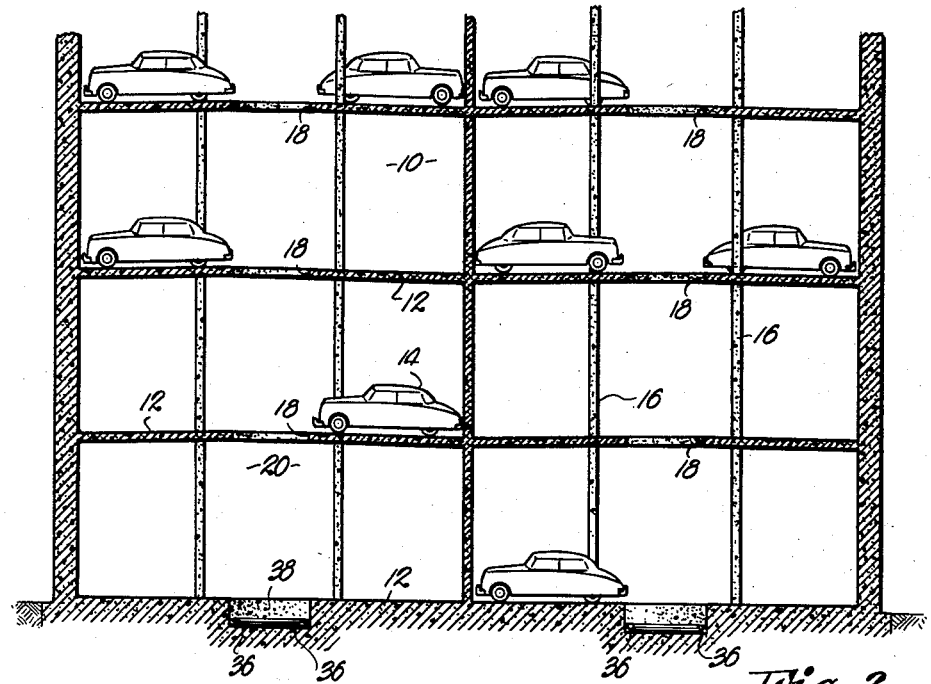
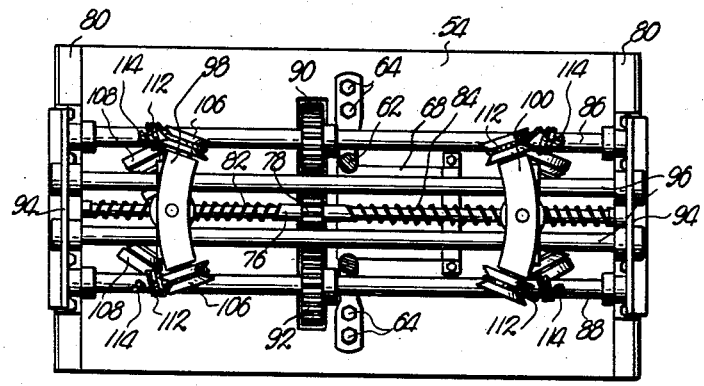

Aug. 24, 1954

A. W. WAHLER 2,687,222

STRUCTURE FOR PARKING AUTOMOBILES

Filed Feb. 19, 1951

INVENTOR.
August W. Wahler
BY
ATTORNEY.

INVENTOR.
August W. Wahler
BY
ATTORNEY.

Patented Aug. 24, 1954

2,687,222

UNITED STATES PATENT OFFICE 2,687,222

STRUCTURE FOR PARKING AUTOMOBILES

August W. Wahler, Kansas City, Mo.

Application February 19, 1951, Serial No. 211,784

2 Claims. (Cl. 214—16.1)

This invention relates to building construction and particularly garages adapted for storing automobiles, the primary object being to provide novel means for handling a relatively large number of automobiles in the garage and moving the same to and from a place of storage with speed and relative ease while maintaining utilization of all available space for a building of given dimensions.

It is well appreciated that one of the most harassing problems in large metropolitan areas particularly, is the handling of traffic and making provision for storage of automobiles in the downtown districts. Storage buildings of several floors are now universally used but for the most part the automobiles are moved to and from the various levels by ramp means. Such ramps necessitate the driving of the automobiles themselves and are not entirely satisfactory because of the space consumed thereby.

Accordingly, it is the most important object of the present invention to provide an automobile storage building that includes an elevator for raising and lowering the automobiles to the various levels of the building, the elevator being so formed as to be advanced along an elliptical path of travel within the building, all for the purposes above set forth.

Another important object of this invention is the provision of elevator construction in automobile storage buildings that includes a vertical, oval-shaft formed in the building and through all of the floors thereof, and wherein is disposed a composite unit that is capable of traveling throughout the length of the oval and includes the vertically reciprocable elevator as a part thereof.

A further object of this invention is the provision of an automobile storage building wherein the vertically reciprocable elevator just above mentioned, is not only adapted for traveling throughout the oval path, but is rotatable on its reciprocable axis whereby to facilitate loading and unloading of the automobiles thereon and thereby avoiding wasted space by an unnecessarily wide elevator shaft.

Other objects of this invention include the way in which the elevator itself is raised and lowered through cable-drum construction; the manner of providing a common prime mover for raising and lowering the elevator and the automobile thereon; the manner of assuring proper winding of the cables on their respective drums, all in a relatively compact unit; and many more minor objects all of which will be made clear or become apparent as the following specification progresses, reference being had to the accompanying drawings, wherein:

Fig. 2 is a fragmentary, vertical, cross-sectional view taken on line II—II of Fig. 1 looking in the direction of the arrows.

Fig. 6 is a cross-sectional view taken on line VI—VI of Fig. 3; and

Figure 1:
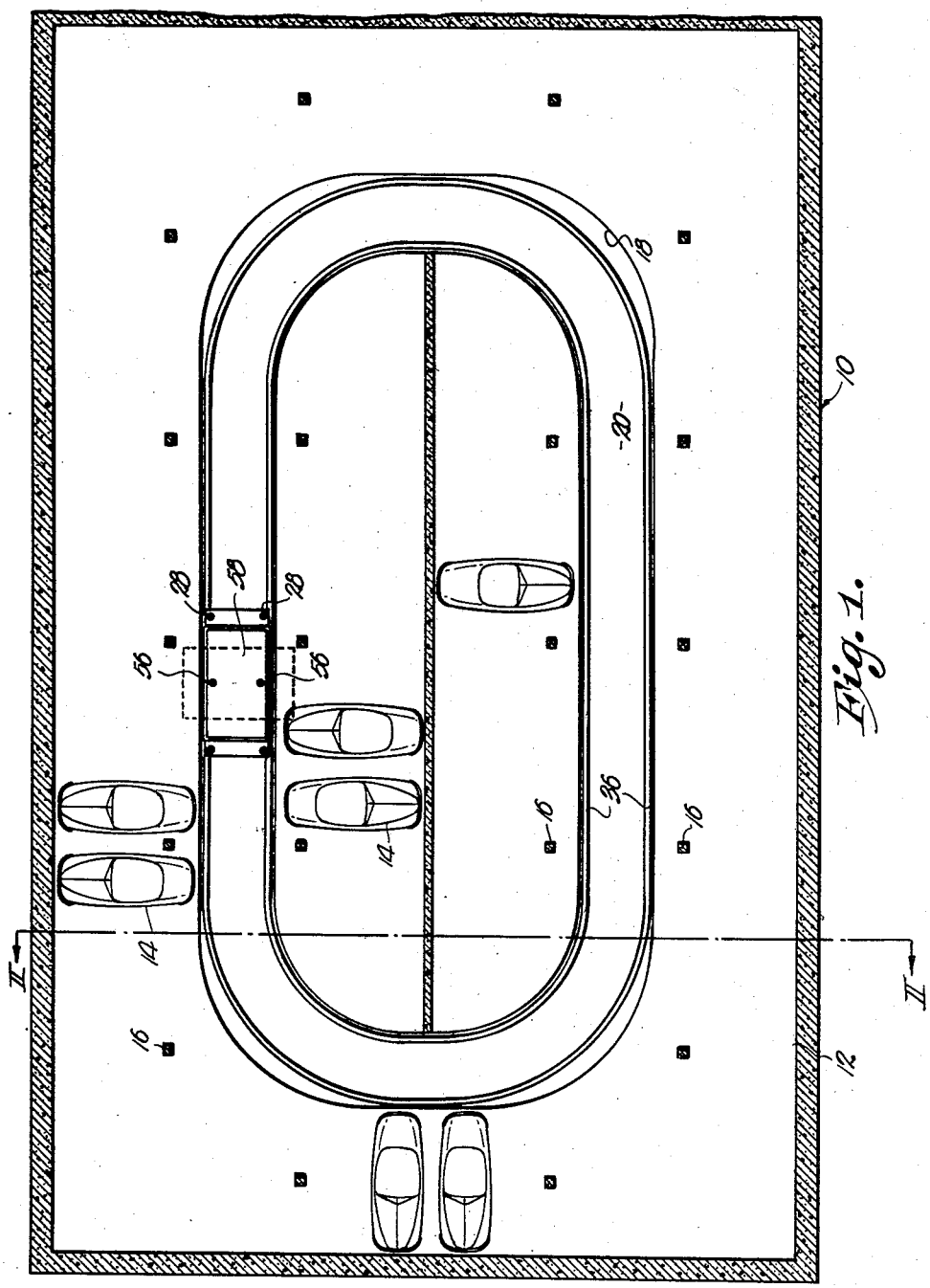
Figure 1 is a horizontal section of a structure for parking automobiles made according to my present invention.

The building chosen for illustration of the principles of the present invention is shown fragmentarily in Figs. 1 and 2 of the drawings and is broadly designated by the numeral 10. Building 10 may have any desired configuration but the broad concepts hereof are more readily adaptable to a rectangular structure as illustrated, and to this end a plurality of floors 12 is provided, spaced sufficiently to accommodate automobiles 14 therebetween and supported in any suitable manner as by vertical pillars 16 suitably arranged throughout the entire building structure 10 somewhat as illustrated in Figs. 1 and 2.

It is desirable that vertical partitions be eliminated as much as possible and each of the superimposed floors 12 is provided with an elliptical or oval opening 18, the openings 18 all being centrally disposed within their respective floors 12 and being vertically aligned to present an elevator shaft broadly designated by the numeral 20.

Figure 3:
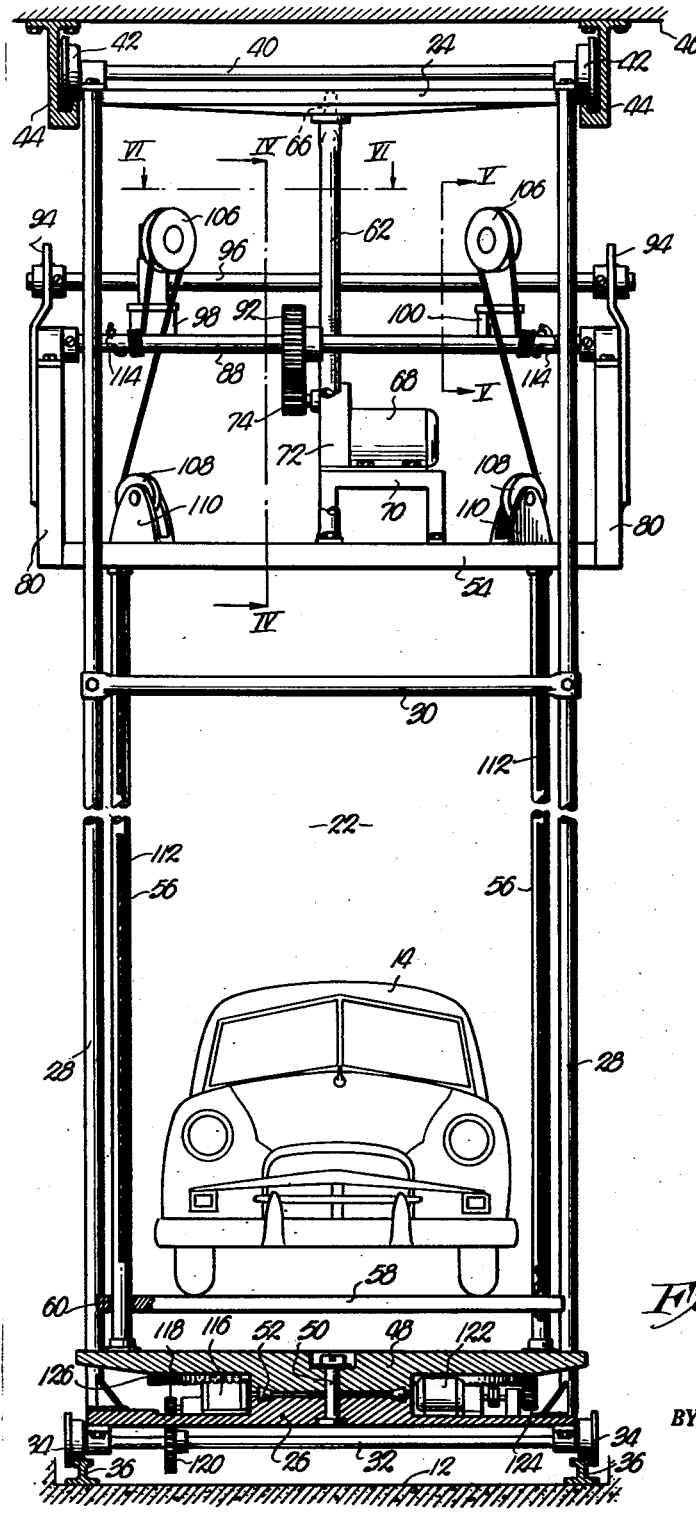
Fig. 3 is an elevational view partially in section illustrating the elevator unit forming a part of the structure.

An elevator unit 22 is disposed within the shaft 20 and includes an uppermost, horizontal plate 24 and a lowermost horizontal plate 26 that are joined by a plurality of elongated vertical columns 28. There are preferably provided four columns 28, each disposed at a corner of the polygonal plates 24 and 26 and rigidly secured thereto in any suitable manner. Columns 28 may additionally be reinforced by joining the same through the medium of cross-bars 30 disposed at each floor 12 respectively where the same will clear the automobiles 14 as the same are moved to and from a stored position on the respective floors 12. The lowermost horizontal plate 26 is provided with a pair of shafts, one only of which is illustrated in Fig. 3 of the drawings and designated by the numeral 32.

The shafts or axles 32 are each in turn provided with a pair of flanged wheels 34 that rest upon spaced guiding tracks 36 that are also oval-shaped as shown in Fig. 1 of the drawings, complementally with the configuration of shaft 20. If desired, the tracks 36 may be disposed within an elliptical cavity 38 formed below the lowermost floor 12 of building structure 10. The uppermost plate 24 is likewise provided with a pair of axles, one only of which is shown in Fig. 3 and designated by the numeral 40. Flanged wheels 42 of the axles 40 are in turn supported by elliptical tracks 44 secured to and depending from ceiling 46 forming a part of the building 10.

The plate 26 rotatably supports a lowermost, horizontal panel 48 through the medium of a centrally disposed, vertical spindle 50 joining the panel 48 and the plate 26, and as the former rotates on its vertical axis 50, it is free to move on roller means 52 that is interposed between the plate 26 and the panel 48. Panel 48 is joined with an uppermost panel 54 spaced below the plate 24 through the medium of a pair of spaced-apart vertical standards 56 and it is upon these standards 56 that an elevator platform 58 is slidably mounted through the medium of openings 60 for vertical reciprocation within the shaft 20. The panel 54 and apparatus carried thereby, are pivotally secured to the plate 24 for rotation on the axis of spindle 50 by means of a U-shaped bracket 62 having the lowermost ends of its legs bolted directly to the uppermost face of panel 54 as at 64.

The bracket 62 is provided with a pivot pin 66 at the center of its bight which extends into the plate 24 and is free to rotate therein.

A prime mover such as an electric motor 68, is secured to a suitable support 70 mounted on the uppermost face of the panel 54 for raising and lowering the elevator platform 58. Prime mover 68 may be provided with a suitable speed reducer unit 72 having a pinion 74 in constant mesh with a center gear 76 that is secured to a center shaft 78 intermediate the ends of the latter. The shaft 78 is rotatably carried by spaced brackets 80 mounted on and extending upwardly from the panel 54 and has opposed screw-threads 82 and 84 formed thereon as is clear in Fig. 6 of the drawings. The brackets 80 also support shafts 86 and 88 for rotation on horizontal axes parallel with the axis of rotation of shaft 78.

Figure 4:
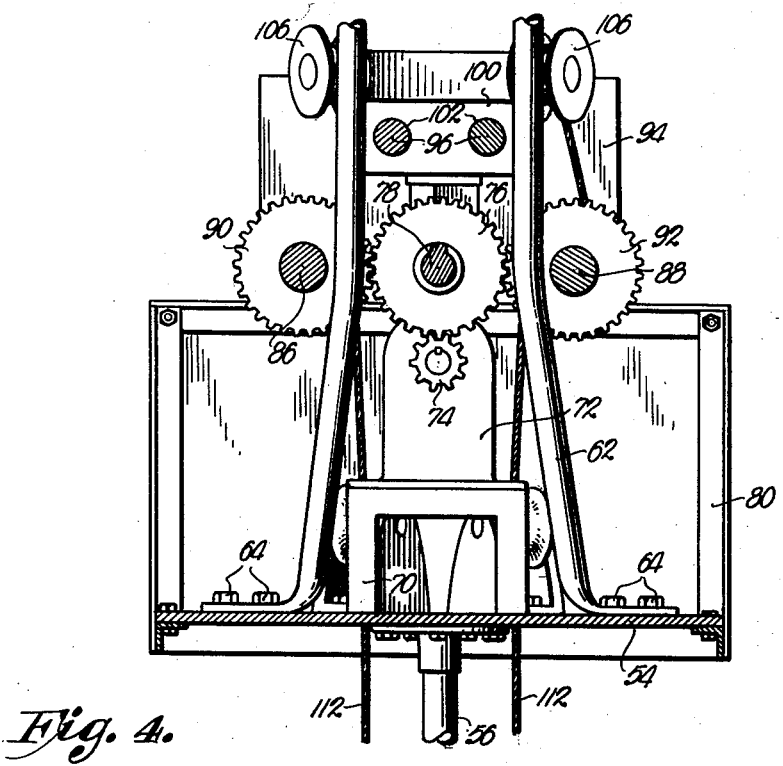
Fig. 4 is an enlarged, fragmentary, cross-sectional view taken on line IV—IV of Fig. 3.

Shafts 86 and 88 carry gears 90 and 92 respectively in mesh with the gear 76 on shaft 78. Extensions 94 on brackets 80 carry a pair of spaced, horizontal guide rods 96 above the shafts 78, 86 and 88 and preferably on each side of a vertical, longitudinal plane through shaft 78 as shown in Fig. 6, and it is also notable that the legs of the bracket 62 extend between shaft 86 and one guide rod 96 and between shaft 88 and the other guide rod 96 respectively. The horizontal guide rods 96 slidably receive for horizontal reciprocation toward and away from each other, a pair of follower blocks 98 and 100 through the medium of openings 102 formed in the latter as shown in Figs. 4, 5 and 7.

Figure 7:
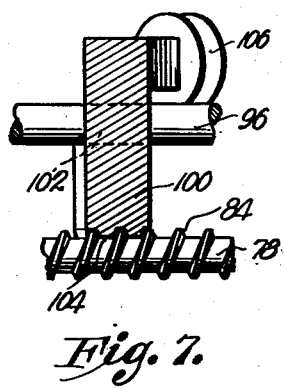
Fig. 7 is an enlarged, detailed, cross-sectional view taken on line VII—VII of Fig. 5.
Figure 5:
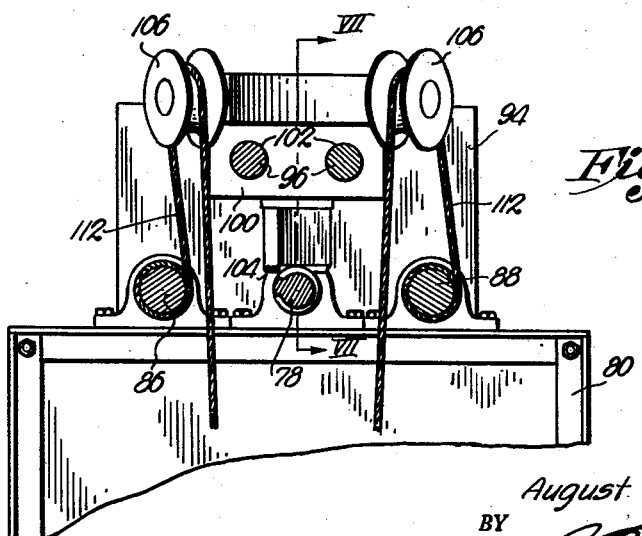
Fig. 5 is an enlarged, detailed, cross-sectional view taken on line V—V of Fig. 3.

Each block 98—100 is provided with threads 104 in the lowermost face thereof that mesh with the respective threads 82—84 on shaft 78 in the manner illustrated in Figs. 5 and 7 of the drawings. Each follower block 98—100 extends above the guide rods 96 therefor and receive a pair of spaced-apart pulleys 106 that are rotatable on separate axes which converge as the respective bracket extensions 94, are approached. The panel 54 is likewise provided with four pulleys 108 corresponding one each to the pulleys 106 and mounted for rotation on horizontal axes through the medium of upstanding brackets 110 on the panel 54. It is noted that all of the axes of rotation of the pulleys 108 are angularly displaced relatively and are in substantially intersecting relationship with the axes of rotation of their corresponding pulleys 106. Suitable clearance is provided in the panel 54 for four cables 112, there being one pair of cables 112 joined at the lowermost ends thereof with the elevator platform 58 adjacent to one of the standards 56 and another pair of cables 112 joined to the platform 58 near the other standard 56 on opposite sides thereof. Each cable 112 passes upwardly from the elevator platform 58 over a respective pulley 108 and thence in looped relationship to a corresponding pulley 106. One cable 112 of each pair thereof is wound about the shaft or drum 86 and one cable 112 of each of the other pairs thereof is wound about the shaft 88. In other words, each shaft 86—88 receives two of the cables 112 and the latter are secured directly thereto as at 114.

Any suitable means may be provided for advancing the elevator 22 around the oval tracks 36—44 and likewise the particular means for imparting rotation to the panels 48—54 and the apparatus carried thereby, may vary from that herein illustrated. However, there is shown a prime mover that may constitute an electric motor if desired, mounted between the panel 48 and the plate 26 for advancing the unit 22 with respect to the tracks 36—44.

The prime mover 116 has a pinion 118 on its drive shaft that is in mesh with a gear 120 on one of the axles 32 and a suitable clearance opening is provided in the plate 26 to accommodate the gears 118—120. Obviously, both of the axles 32 and/or the axles 40 may be driven in a similar manner if desired.

Another prime mover such as an electric motor 122 is mounted between the panel 48 and the plate 26 to rotate the former relative to plate 26. A pinion 124 on the drive shaft of prime mover 122 is in mesh with a ring gear 126 on the lowermost face of the panel 48.

It is realized that if electric motors are used as prime mover means 68, 116 and 122, structure will be needed to couple the same with a suitable source of electrical energy that will permit rotation of the panels 48 and 54 and likewise permit advancement of the entire unit 22 along its elliptical path of travel. Such structure is not herein illustrated since the same may comprise the conventional principles commonly employed in energization of electrical motors or street cars, busses and street railways. In other words, through us of trolley means, together with tracks 36 or 44 as one of the conductors, the unit 22 may move freely through the connection when the source of electrical energy is stationary.

In operation, when it is desired to elevate an automobile 14 from the lower floor 12 to one of the upper floors 12, the platform 58 is lowered to a position flush with the upper face of floor 12 and the automobile 14 is driven thereon. By energization of the prime mover 68, platform 58 and the automobile 14 thereon, are elevated to the desired floor 12. As prime mover 68 is energized, the shafts or drums 86 and 88 are rotated in a direction through gears 74, 76, 90 and 92 to wind the cables 112 thereon. Simultaneously, the follower blocks 100 move together by virtue of their connection through threads 104 with the respective screw-threads 82—84, causing the cables 112 to wind properly on the drums 86 and 88. As soon as the platform 58 reaches a desired level in alignment with one of the floors 12 within shaft 20, the prime mover 116 is energized to move the entire unit 22 along tracks 36–44 to an empty "stall." Next, the prime mover 122 is energized to rotate the panels 48 and 54 relative to the plates 24 and 26 substantially 90 degrees to align the automobile 14 for movement from the platform 58 as indicated in dotted lines by Fig. 1 of the drawings.

It is noted that the platform 58 must be raised slightly above the floor 12 to receive the automobile 14 and that sufficient clearance is provided at one end of the parked automobiles to clear the platform 58 during such rotative movement thereof. Obviously, when the platform 58 is to be returned to the ground floor 12, or when an automobile 14 is to be removed from one of the floors to be returned to a customer, the procedure just above outlined is reversed.

It is now clear that through use of the structure herein provided, a large number of automobiles may be handled expeditiously and that virtually all of the space that is presented by building structure 10 may be utilized for receiving the automobiles. To this end, it is notable in Fig. 1 that even the space within the confines of the oval shaft 20, may be placed to use in receiving the parked automobiles 14.

While but one embodiment of the present invention has been illustrated, it is clear that many details of construction may be varied within the broad principles of the invention and it is, therefore, desired to be limited only by the scope of the appended claims.

Having thus described the invention, what is claimed as new and desired to be secured by Letters Patent is:

1. In a garage, structure for transporting automobiles to and from points of storage in the garage, said structure comprising an upper set of tracks and a lower set of tracks; upright primary framework between the tracks; wheels on the framework for each set of tracks respectively and engageable therewith for rendering the framework mobile; a turntable at the lower end of said primary framework; means attaching the turntable to said primary framework for rotation on a vertical axis; a plurality of upright guides mounted on the turntable; secondary framework mounted on the guides at the uppermost ends thereof and pivotally secured to the primary framework for rotation with the turntable; a platform mounted on the guides for vertical reciprocation between the turntable and said secondary framework; mechanism operably coupled with the platform for raising and lowering the latter, said mechanism being mounted on the secondary framework for rotation therewith and with the platform, the guides and the turntable as a unit with respect to the primary framework and the tracks, said mechanism including a number of hoists each having a rotatable drum, each drum being provided with a number of hoisting cables wound thereabout and fastened to the platform; and guide pulleys for each cable respectively carried by the secondary framework.

2. Structure as set forth in claim 1 wherein is provided a prime mover common to the drums for rotating the same and apparatus operably inter-connecting the prime mover and the pulleys for shifting the latter to move the cables longitudinally of the drums as the latter rotate.

References Cited in the file of this patent

UNITED STATES PATENTS

| Number | Name | Date |
|---|---|---|
| 1,288,567 | Hall | Dec. 24, 1918 |
| 1,851,262 | Riblet | Mar. 29, 1932 |
| 2,268,800 | Butzien | Jan. 6, 1942 |

FOREIGN PATENTS

| Number | Country | Date |
|---|---|---|
| 683,197 | France | June 6, 1930 |
| 127,519 | Australia | May 6, 1948 |